(12) United States Patent
Schliesser et al.

(10) Patent No.: US 12,004,523 B2
(45) Date of Patent: Jun. 11, 2024

(54) DISPLACEMENT ELEMENT PAIR

(71) Applicant: Albert Handtmann Maschinenfabrik GmbH & Co. KG, Biberach (DE)

(72) Inventors: Gerhard Schliesser, Wain (DE); Alwin Schmid, Steinhausen/Rottum (DE); Juergen Rechsteiner, Eberhardzell (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 153 days.

(21) Appl. No.: 17/885,465

(22) Filed: Aug. 10, 2022

(65) Prior Publication Data
US 2023/0047261 A1  Feb. 16, 2023

(30) Foreign Application Priority Data

Aug. 10, 2021 (EP) .................................. 21190588

(51) Int. Cl.
*A22C 11/00* (2006.01)
*A22C 11/10* (2006.01)
(52) U.S. Cl.
CPC .......... *A22C 11/006* (2013.01); *A22C 11/107* (2013.01)
(58) Field of Classification Search
CPC ............................ A22C 11/006; A22C 11/107
USPC ................... 452/30–32, 46–48, 51
See application file for complete search history.

(56) References Cited

U.S. PATENT DOCUMENTS

| | | | |
|---|---|---|---|
| 3,264,679 A | 8/1966 | Moekle | |
| 4,418,447 A | 12/1983 | Ziolko | |
| 4,905,349 A * | 3/1990 | Townsend | A22C 11/107 53/550 |
| 5,133,685 A | 7/1992 | Stöhr | |
| 5,145,451 A | 9/1992 | Staudenrausch | |
| 5,709,600 A | 1/1998 | Xie et al. | |
| 6,045,445 A * | 4/2000 | Hummel | A22C 11/006 452/49 |
| 7,704,131 B1 * | 4/2010 | Malenke | A22C 11/107 452/46 |

(Continued)

FOREIGN PATENT DOCUMENTS

| | | |
|---|---|---|
| CN | 101147504 A | 3/2008 |
| JP | 104229131 A | 8/1992 |
| WO | 2017081648 A1 | 5/2017 |

OTHER PUBLICATIONS

China National Intellectual Property Administration, Office Action and Search Report Issued in Application No. 202210932506.0, Jul. 18, 2023, 16 pages. (Submitted with Partial Translation).

(Continued)

*Primary Examiner* — Richard T Price, Jr.
(74) *Attorney, Agent, or Firm* — McCoy Russell LLP

(57) ABSTRACT

The present disclosure relates to a displacement element pair for dividing a sausage strand, conveyed between the displacement elements, into individual sausages, each displacement element having at least one wing with a first wing section and a second wing section between which an outwardly widening, in particular V-shaped cutout is formed, both the first and the second wing section having a laterally curved pocket or an opening. The present disclosure also relates to a corresponding apparatus for dividing a sausage strand.

18 Claims, 9 Drawing Sheets

(56) References Cited

U.S. PATENT DOCUMENTS 7,762,874 B2 * 7/2010 Schlieber ............. A22C 11/104
    452/47
2018/0263248 A1 9/2018 Thring et al.

OTHER PUBLICATIONS

1 Japanese Patent Office, Office Action Issued in Application No. 2022-117343, Jun. 27, 2023, 14 pages.
China National Intellectual Property Administration, Office Action and Search Report Issued in Application No. 202210932506.0, Nov. 15, 2023, 18 pages. (Submitted with Partial Translation).

* cited by examiner

DISPLACEMENT ELEMENT PAIR

CROSS-REFERENCE TO RELATED APPLICATION

The present application claims priority to European Patent Application No. 21190588.0 filed on Aug. 10, 2021. The entire contents of the above-listed application are hereby incorporated by reference for all purposes.

TECHNICAL FIELD

The present disclosure relates to a displacement element pair as well as to an apparatus for dividing a sausage strand by means of such a displacement element pair.

BACKGROUND

For making sausages, a pasty mass is filled into a sausage casing, e.g. via a filling tube, whereby a stuffed sausage strand is produced. For dividing such an "endlessly" filled sausage strand into portions of equal length during filling, the pasty mass in the product strand is displaced at predetermined intervals making use of so-called opposed displacement elements, and in particular a constriction point is formed. To this end, the sausage strand to be filled can be twisted about its longitudinal axis, e.g. by means of a twist-off unit, whereby a twist-off point will then jump in at the constriction point and the sausage strand will thus be subdivided. When production takes place making use of displacement elements of the type commercially available at present, folds form between the displacement elements during constriction, which, though they cannot prevent the twisting of the constriction point and the jumping in of the twist-off point, may nevertheless cause a delay, i.e. the twist-off point will jump in later, i.e. when seen in the conveying direction, it will jump in only further downstream. This means that the formation of the twist-off point or division point takes more time and the product casing is subjected to more stress. Sensitive sausage casings may be damaged during displacement, and this severely impairs production.

FIG. 6A shows, in a perspective view, two opposed displacement elements according to the prior art, which are rotated about their respective axis A in opposite directions. The sausage strand passes between the displacement elements. As can be seen from FIGS. 6A and 6B, each displacement element has at least one wing with an upper wing section and a lower wing section, which, as shown in FIG. 6B, interengage at a division position. As can be seen from FIGS. 6B and 6D, the respective opposed upper wing sections and the respective opposed lower wing sections then extend at an angle of e.g. 2 times 20° relative to each other. As can be seen from FIG. 6C, this has the effect that, between the two upper and also between the two lower surfaces of the wing sections, a respective area is created, in which the sausage strand spreads out in folds, thus slowing down the twisting of the sausage casing. The respective wing sections extend at an angle relative to each other in order to allow the displacement elements to be positioned as close as possible to each other, while the wings can nevertheless move past each other without colliding.

Taking this as a basis, it is the object of the present disclosure to provide improved displacement elements for an apparatus for dividing a sausage strand, which allow the division point to jump in quickly and gently.

SUMMARY

According to the present disclosure, a displacement element pair for dividing a sausage strand, conveyed between the displacement elements, into individual sausages is provided. Each displacement element has at least one wing having a first wing section and a second wing section between which an outwardly widening, in particular V-shaped cutout is formed. Both the first, i.e. for example the upper wing section and the second, for example the lower wing section have a laterally curved pocket or an opening.

The curved pocket or the opening, which are each located in an area within the outer contour of the respective wing section, allow the displacement elements to move past each other in such a way that the wing sections will not collide during rotation, since e.g. a first wing section can pass in the area of the curved pocket of the respective wing section of the opposed displacement element, i.e. can move through the free space created by the pocket or the opening. Thus, it is made possible that at a division position, at which the sausage strand is maximally constricted, and the two widening, in particular V-shaped cutouts overlap maximally, the first and second wing sections of the respective displacement elements can be arranged substantially parallel to each other with a small distance therebetween, so that the formation of folds between the surfaces of the wing sections can be prevented and the twist-off point can jump in more quickly and more gently.

According to an embodiment, the displacement edges, i.e. the outer contours of the first and second wing sections of a respective displacement element, are located, at least in the area of the widening cutout, either a) in substantially parallel planes or b) in a common plane. If the displacement edges of the first and second wing sections are located in parallel planes, the wings can interengage, so as to divide the sausage strand. If the displacement edges of the first and second wing sections are located in a common plane, the division can be accomplished by wings oriented parallel to each other. In this case, the respective planes extend in particular through the middle of the wing width in the area of the widening section.

This arrangement allows to keep the distance between the wings of the opposed displacement elements small at a division position, at least in the area of the outwardly widening, in particular V-shaped section. The distance may here also be substantially constant. The wing sections do not diverge, as in the prior art, so that a formation of folds can effectively be prevented and so that the sausage strand will twist in the shortest possible time during the twisting process and the twist-off point will jump in. In total, the division point will thus be produced more gently.

Depending on the thickness of the wing elements, the distance between the planes can lay in the following range: magnitude of thickness of the wing sections +0 mm to 4 mm, in particular magnitude of thickness +0.1 mm to 3 mm, in particular +0.2 mm to 1 mm. In this range, there will be no jamming and the twist-off point will jump in quickly and fully. What is here considered is the thickness, in particular the maximum thickness (in case of a non-constant thickness) of the wing sections in the widening cutout.

In case a), the curved pocket is curved outwards to a first side in the first wing section of a respective displacement element, and the curved pocket is curved to the opposite side in the second wing section, and in case b), the curved pockets in the first and second wing sections are curved to the same side. The wing sections can thus move past each other without colliding.

According to an embodiment, at a division position, at which the sausage strand is maximally constricted and the two widening sections overlap maximally, the wing of the first displacement element and the wing of the second displacement element may interengage or the wings may be arranged substantially parallel side by side.

According to an embodiment, the wings may be arranged in a flag-like manner on a holder, via which they are connectable to a rotating mechanism, which includes in particular a drive shaft, for rotating the displacement elements about an axis or for moving them such that they circulate around a plurality of axes. This means that the displacement elements are either rotated about e.g. their central axis in spaced relationship with one another, or they are fixed to a conveying unit, e.g. a chain or a conveyor belt, etc., and circulate.

The displacement elements according to the present disclosure have, even if they are rotated or if they circulate, the same advantages as displacement elements which are moved linearly towards each other and the wings of which can be arranged very close to one another at the division position. The rotational or circulating movement, however, allows an increase in the production speed according to the present disclosure.

An apparatus for dividing a sausage strand comprises at least one displacement element pair. In addition, the apparatus comprises a conveying device for conveying the stuffed sausage strand between the opposed displacement elements. Furthermore, the apparatus comprises a rotating mechanism for rotating the displacement elements about a respective axis of rotation or for moving them such that they circulate around a plurality of axes of rotation.

Although the displacement elements can displace the pasty mass even if no twist-off device is provided, a twist-off device for rotating the sausage strand about its longitudinal axis L will be of advantage so that a twist-off point can be formed between the individual sausages. In the case of co-extruded sausages, for example, where a sausage casing is extruded together with the pasty mass, no twist-off device is necessary. Here, too, the present disclosure allows to produce a well-formed division point without oblique squeezing.

According to an embodiment, the displacement elements are arranged such that, at a division position, at which the widening cutouts of the opposed displacement elements overlap maximally, the respective displacement edges of the first wing section of a displacement element and of the second wing section of the opposed displacement element are located in essentially parallel planes, at least in the area of the respective widening cutout. Essentially parallel means that the maximum deviation is e.g. 0° to ±10°, in particular 0° to 5°, or 0° to 3°.

The displacement elements may here be rotated about their central axis A1 via the rotating mechanism, the central axis extending e.g. substantially parallel to the planes E1, E2, in which the respective displacement edge of the wing sections is located at least in the area of the widening cutout. In some embodiments, the central axis or axis of rotation extends perpendicular to the conveying direction T of the sausage strand.

According to an embodiment, the respective opposed displacement elements are arranged on two conveying units, in particular a conveying chain or a conveyor belt, which circulate around two or more axes. The axes of rotation may extend substantially parallel to the planes, in which the displacement edges of the first and second wing sections are arranged in the area of the cutout, which is in particular V-shaped. The axes of rotation may extend perpendicular to the conveying direction of the sausage strand.

According to a further embodiment, a displacement element has a plurality of circulating wings, or a plurality of displacement elements have a respective wing arranged on the respective circulating conveying unit. The throughput can be increased in this way.

The displacement elements are produced by means of 3D printing or injection molding. By turning away from the use of sheet metal for making the displacement elements, new shapes and contours are now possible. Although displacement elements made of plastic have already existed up to now in the prior art, their shape was similar to the contour of the sheet metal elements. The use of 3D printing allows to produce, in a particularly simple manner, a displacement element having the pockets or the openings according to the present disclosure. However, also displacement elements made of metal can be produced by means of 3D printing.

The displacement element pair may, for example, be made of a material of the following group:

plastic, metal, in particular stainless steel.

According to a particular embodiment, at least in the area of the cutout widening in particular in a V-shape, the distance between the plane in which the displacement edge of the first wing section is located and the plane in which the outer contour of the first wing section of the opposed displacement element is located, and the distance between the plane in which the displacement edge of the second wing section is located and the plane in which the displacement edge of the second wing section of the opposed displacement element is located, are >=the thickness of the wing sections, and lie in particular in a range: magnitude of the displacement wing thickness +0 mm to 4 mm, in particular magnitude of the thickness +0.1 to 3 mm, in particular 0.2 mm to 1 mm What is here considered is the thickness, in particular the maximum thickness of the wing sections in the widening cutout.

When, viewed in the conveying direction, the distance between the displacement edges can be kept suitably small, the division point can jump in very well and no folds will form, since the wing sections of the opposed displacement elements are located close together.

According to an embodiment, the at least one wing does not extend radially from a holder that rotates about an axis. The opposed wings can thus easily move past each other.

BRIEF DESCRIPTION OF THE FIGURES

The present disclosure will be explained hereinafter in more detail making reference to the following figures.

DETAILED DESCRIPTION

Figure 1:
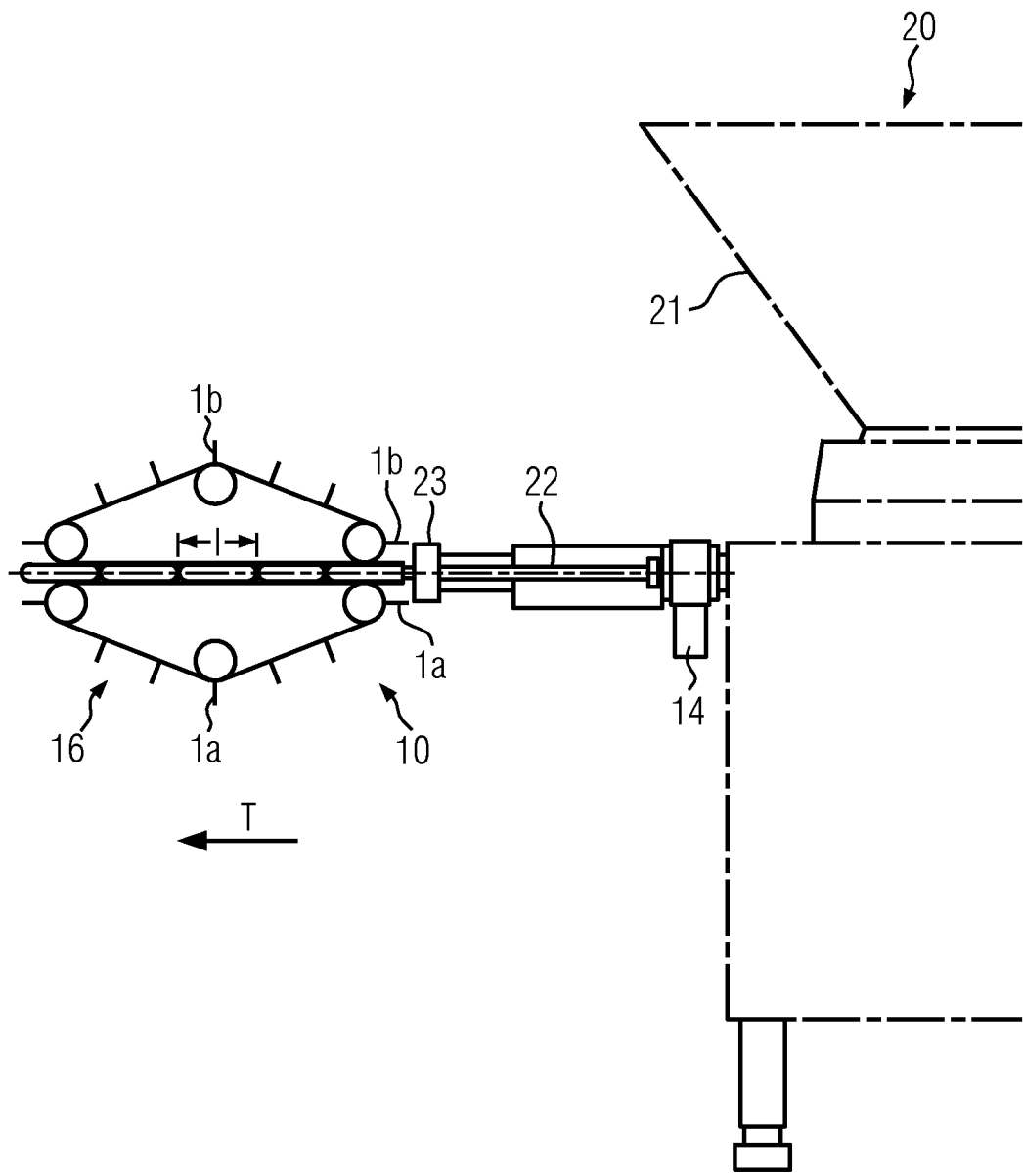
FIG. 1 shows schematically the representation of a filling machine with an apparatus for dividing a stuffed sausage strand.

FIG. 1 shows, in a schematic representation, an example of a filling machine 20 for producing a stuffed sausage strand, which, making use of the apparatus 10 according to the present disclosure, is divided into individual sausage strand sections having a predetermined length. The filling machine 20 is provided with a filling hopper 21 in a manner known, via which a pasty mass, e.g. sausage meat, is filled in and then pushed into a filling tube 22 via a feed system that is not shown. A casing brake 23, for example, is located at the end of the filling tube. For twisting off the stuffed sausage strand, a twist-off unit 14, in particular a twist-off gear unit, is here optionally provided, which is driven via a motor. By means of the twist-off unit 14, the filling tube 22 can be rotated about the longitudinal axis L together with the casing installed thereon.

Through the filling tube 22, the pasty mass is ejected into the casing, e.g. the sausage skin, which is installed e.g. on the filling tube 22 and held by the casing brake 23, whereby the stuffed sausage strand is produced in the manner known.

Immediately downstream of the filling tube 22, the apparatus 10 for dividing the stuffed sausage strand is provided. The sausage strand is to be divided by the apparatus 10 into individual portions of a specific length 1.

For this purpose, at least one displacement element pair 1a, 1b is provided. In the embodiment shown in FIG. 1, only an exemplary conveying device 16 is shown, which comprises opposed, circulating conveying units, e.g. conveyor belts or conveyor chains etc., between which the stuffed sausage strand 11 is conveyed.

In the present embodiment, the displacement elements 1a, 1b are arranged on the circulating conveying unit, e.g. the circulating conveyor belt, chain, etc., at distances, in particular uniform distances from one another, as will be explained in more detail hereinafter. This embodiment will be explained in more detail hereinafter making reference to FIGS. 2A and 2B.

Figure 3:
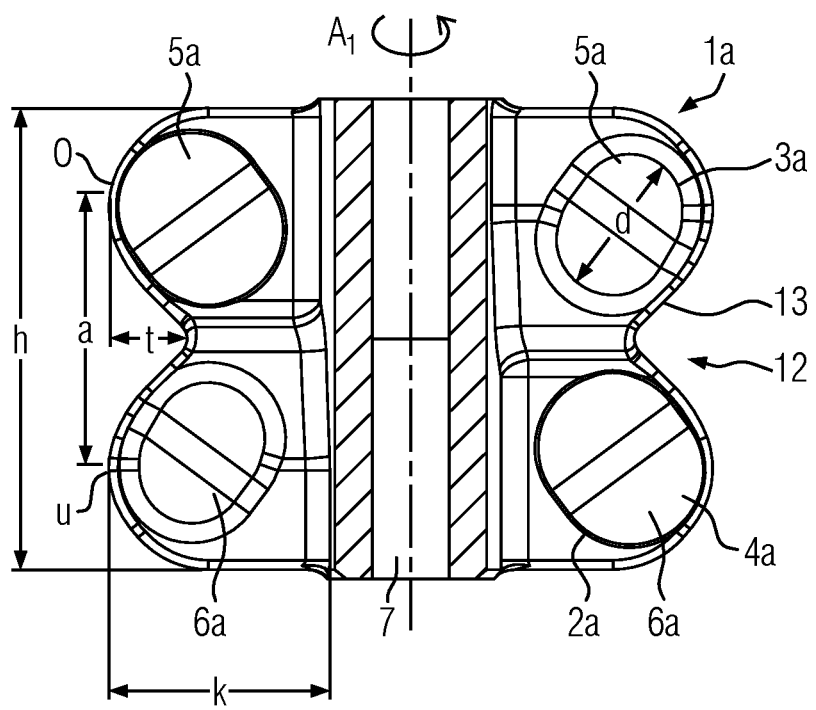
FIG. 3 shows, in a side view, a displacement element according to an embodiment of the present disclosure.

FIG. 3 shows, schematically, a displacement element according to an embodiment of the present disclosure. The displacement element has at least one wing 2a, comprising an upper, i.e. first wing section 3a and a lower, i.e. second wing section 4a. Between the two wing sections, an outwardly widening, in particular V-shaped cutout 12, which is open on the edge-side, is provided. In the area of the V-shaped cutout 12, the displacement edges 13 are arranged.

The at least one displacement wing 2a is arranged in a flag-like manner on a holder 7, i.e. it projects laterally therefrom. The respective displacement wing may extend from the holder in a direction that does not correspond to the radial direction. As such, the displacement wings can actually overlap in the center plane.

The holder 7 is adapted to be connected to a rotating mechanism 15, which, for example, has a drive shaft, for rotating the respective displacement element about an axis A1. The height h of the displacement element is e.g. in a range of 20 mm to 80 mm, in particular 30 mm to 50 mm. The dimension a from the upper point O of the cutout 12 to the lower point U of the cutout 12 is e.g. in a range from 15 mm to 75 mm, in particular between 25 mm and 45 mm. The depth t of the cutout 12 is e.g. in a range from 5 mm to 30 mm, in particular from 7 mm to 25 mm. The outward extension k of the lower and upper wing sections 3a, 4a is e.g. in a range from 30 mm to 80 mm. The thickness of the wings is e.g. in a range from 1 mm to 6 mm, or from 1 mm to 3 mm Displacement elements of this kind are suitable for sausage calibers in a range from 8 mm to 60 mm. The present disclosure also allows the use of the displacement elements in connection with clippers, where the sausage diameters processed are actually larger (e.g. up to 60 mm).

Both the upper and lower wing sections 3a, 4a have laterally curved pockets 5a, 6a, which allow opposed displacement elements to move past each other without colliding, i.e. the outermost points O and U of the outer contour and of the displacement edges 13, respectively, can move through the free space defined by the pockets.

Alternatively, it is also possible to simply form, instead of the pockets 5a, 5b, 6a, 6b, an opening in the surface of the upper and lower wing sections within the outer contour of the wings. Also this will allow the wings to easily move past each other. However, the solution making use of the pockets additionally provides improved stability and the sausage strand can be better supported during dividing.

In connection with FIGS. 4A to 4D, a first embodiment of a displacement element is now explained, in the case of which the wing sections 3a, 4a arranged one above the other (or laterally side by side) are located displaced from each other in parallel planes E1, E2. This can be seen in particular in the side view in FIG. 4C. The displacement edge 13 of the upper wing section 3a is located in a first plane E1 and the displacement edge of the lower wing section 4a is located in a second plane E2, which is parallel to the plane E1, the planes E1 and E2 extending at a distance s, which lies in a range that depends on the displacement wing thickness in the area of the displacement edge in the widening section 12 (if the thickness is not constant, the maximum thickness is considered): distance s=displacement wing thickness +0 mm to 4 mm, in particular +0.1 mm to 3 mm, or +0.2 to 1 mm. The wing sections 3a, 4a adjoin each other in a transition area. The planes E1 and E2 can be parallel to the axis of rotation, in particular parallel to a plane defined by a vector along the axis of rotation A1 and a vector perpendicular to the axis of rotation A1.

Figure 4A:
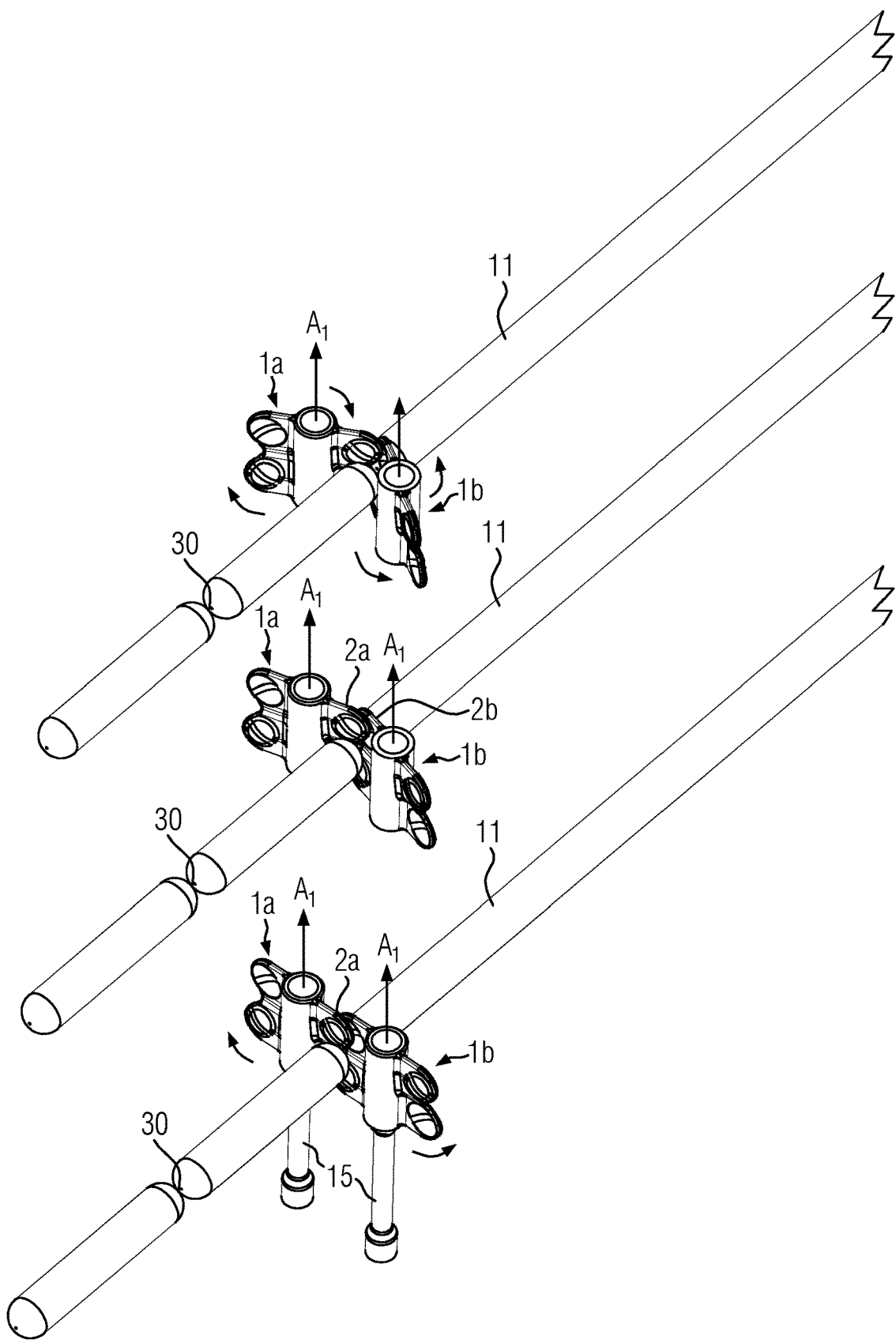
FIG. 4A shows a displacement element pair according to an embodiment at three different positions.
Figure 4B:
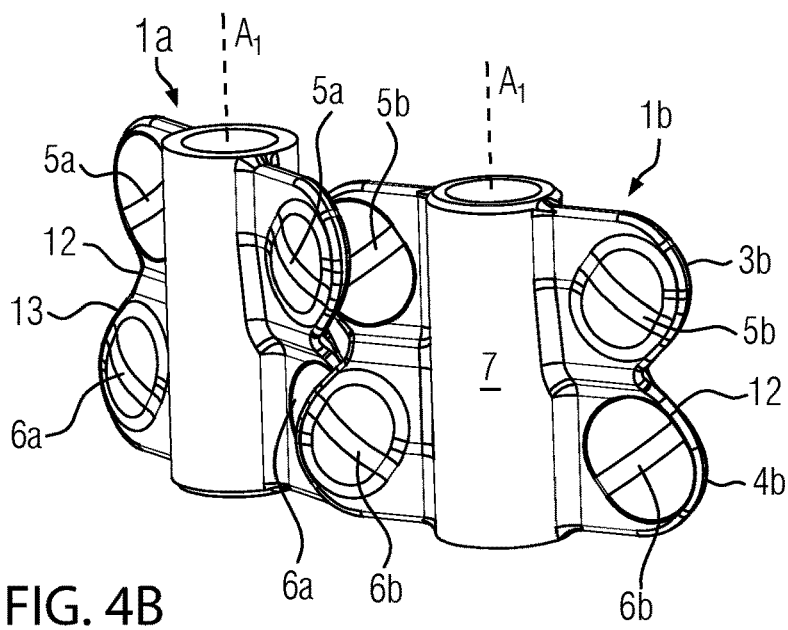
FIG. 4B shows, as an enlarged detail, a perspective view of the displacement element pair shown in FIG. 4A.
Figure 4C:
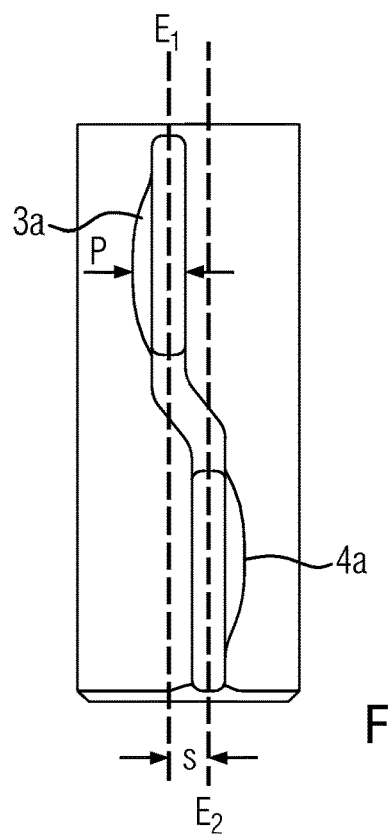
FIG. 4C shows a side view of a displacement element according to the embodiment in FIGS. 4A and 4B.
Figure 4D:
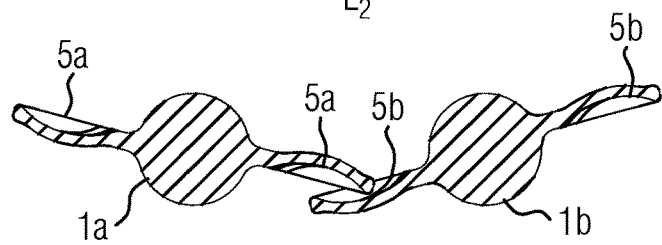
FIG. 4D shows a top view of the embodiment shown in FIG. 4B.

In this embodiment, the curved pocket 5a, 5b is, in the upper wing section 3a, 3b of a respective displacement element 1a, 1b, curved outwards to a first side, in FIG. 4C to the left. In the lower wing section 4a, 4b, the pocket 6a, 6b curves to the opposite side. FIG. 4d shows a cross-section through the pockets 5a. The curvature creates a free space such that the wings can move past each other without colliding. In the embodiment shown in FIGS. 4A-4D, the upper (first) and lower (second) wing sections 3a, 3b, 4a, 4b of the opposed displacement elements 1a, 1b interengage. This means that at a division position, at which the sausage strand 11 is maximally constricted and the two sections 12, which widen here in a V-shape, overlap maximally, the upper wing section 3a of the first displacement element and the lower wing section 4b of the second displacement element are located in a plane E1 and the upper wing section 3b of the second displacement element and the lower wing section 4a of the second displacement element are located in a plane E2. Such a division position is shown in the lowermost representation in FIG. 4A.

The uppermost representation in FIG. 4A shows how the displacement elements rotate, in the direction of the arrow, about the respective axes A1 and start to divide the incoming sausage strand 11 and displace pasty mass. The pockets allow the wings to move past each other without blocking and a distance between the two axes of rotation of e.g. 50 mm to 150 mm can be realized. The wings 2a, 2b move towards each other until they have reached the division position, as can be seen in the lowermost representation in FIG. 4A. When the sausage strand 11 to be filled is twisted by means of the twist-off unit, the twist-off point 30 can now jump in and the sausages are divided. Subsequently, the wings 2a, 2b will move apart again in the direction of the arrow. The pockets 5a, 5b, 6a, 6b allow the wings 2a, 2b to move apart again without colliding. The drive is effected by a rotating mechanism 15, which is connectable to the holder 7, in the present case via the driven shaft 16. The depth of the pocket p results from the center distance of the drive shafts and the structural design of the displacement elements. The pockets bulge laterally outwards and may, for example, be substantially oval in shape.

Also an opening, which is not shown, is configured such that the displacement elements can move past each other accordingly.

Figure 5A:
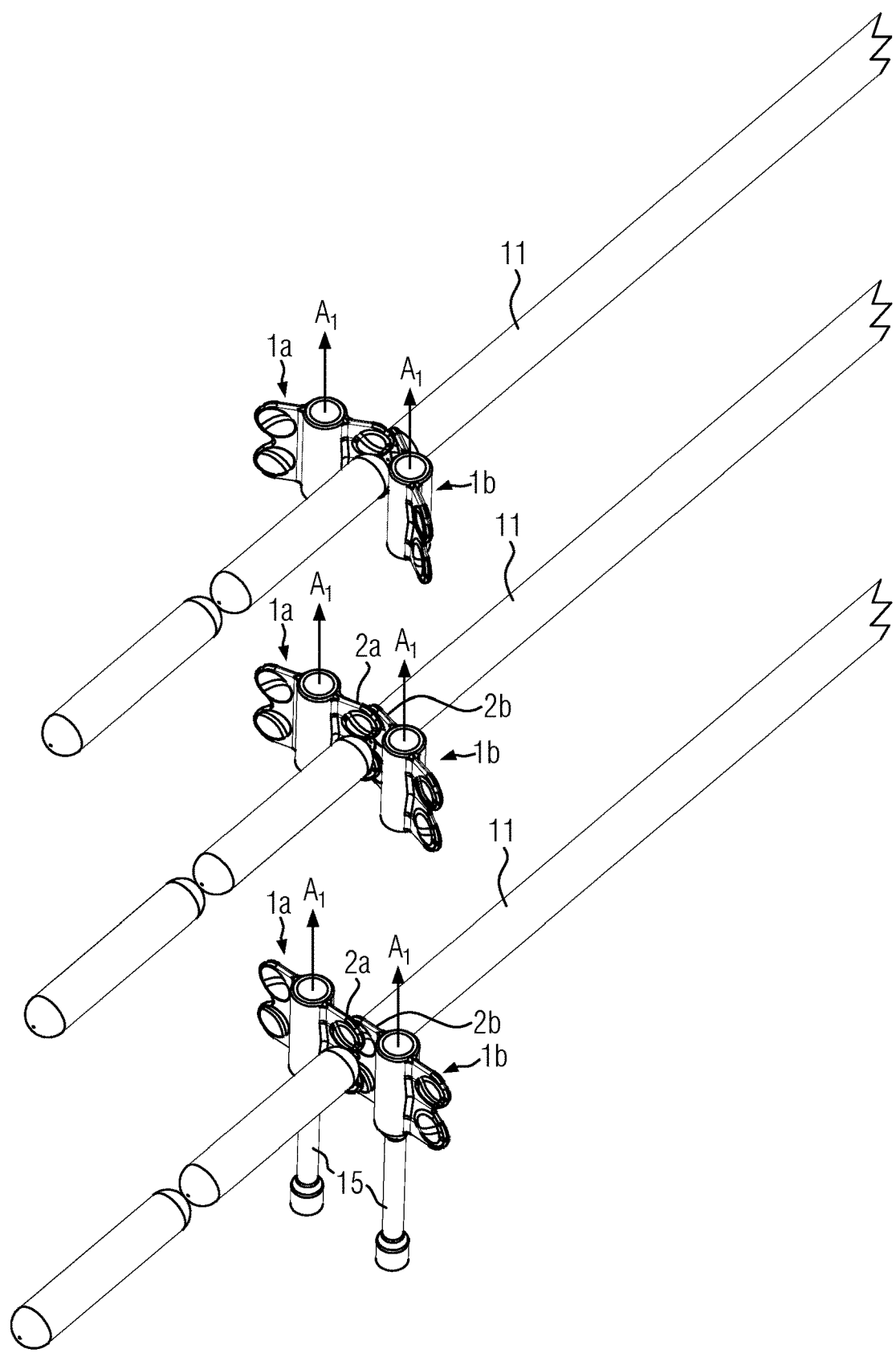
FIG. 5A shows a further embodiment of a displacement element pair at three different positions.
Figure 5B:
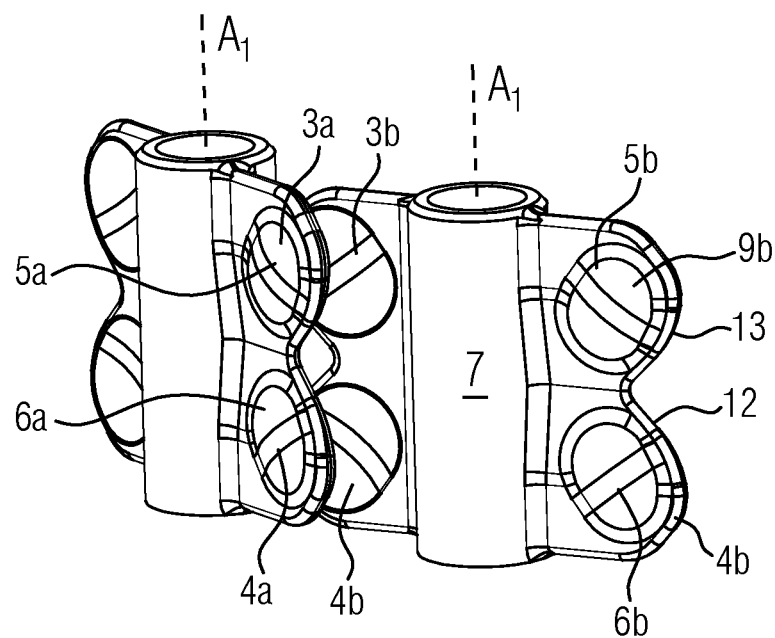
FIG. 5B shows, as an enlarged detail, the displacement element pair of the embodiment shown in FIG. 5A.
Figure 5C:
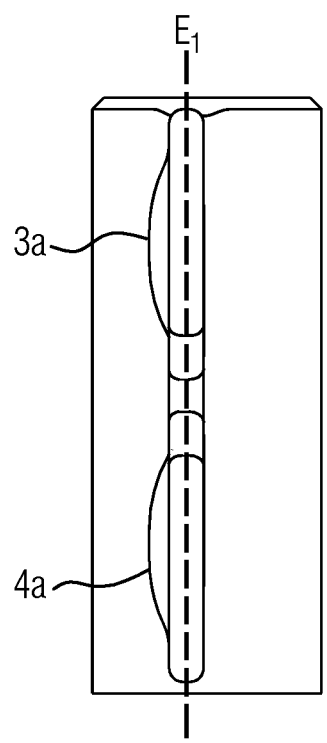
FIG. 5C shows a side view of a displacement element of the type shown in FIGS. 5A and 5B.

FIG. 5C shows a further embodiment corresponding essentially to the embodiment shown in connection with FIGS. 4A-4D, with the exception that, at least in the area of the widening section 12, the displacement edges 13 of the upper and lower wing sections 3a, 3b, 4a, 4b of a respective displacement element are located in a common plane E1, i.e. are not arranged displaced from one another. As for the rest, this embodiment corresponds to the embodiment shown in connection with FIG. 4a. At a division position, at which the sausage strand 11 is maximally constricted and the two widening cutouts 12 are maximally superimposed, the wings 2a, 2b are here arranged substantially parallel side by side, as can be seen from the lowermost representation in FIG. 5A. Also in this case, the openings and pockets 5a, 5b, 6a, 6b, respectively, allow the wings to move past each other without colliding. At the division position, e.g. the upper and lower wing sections 3a, 4a of the first displacement element are located in a plane Ea and the upper wing section 4a and the lower wing section 4b of the second displacement element 2b are located in a plane Eb parallel to the plane Ea, which, as described above, are parallel to a plane defined by a vector along the axis of rotation A1 and a vector perpendicular to the axis of rotation A1.

The distance between the planes lies also here, for example, in particular in a range corresponding to the dimension of the displacement wing thickness in the area of the displacement edges in the widening area 12 plus +0 mm to 4 mm, in particular 0.1 to 3 mm, or 0.2 to 1 mm, at least in the area of the widening opening 12.

FIG. 5B shows in detail how the wings 2a, 2b can move towards each other.

In the case of the apparatuses for dividing a sausage strand shown in FIGS. 4A and 5A, the sausage strand is conveyed in the conveying direction T via a conveying device, which is not shown, e.g. by means of two opposed conveyor belts.

In the case of the embodiment shown in FIGS. 4A-4D and 5A-5C, the displacement elements each turn about an axis A1, in particular the central axis—i.e. they rotate. The displacement elements may, however, also be moved in a circulating manner about a plurality of axes of rotation A1, A2, as can especially be seen from FIGS. 2A and 2B. The displacement belts may be arranged one above the other, as in FIG. 2A, but the axes may also be vertical, so that the two displacement belts are arranged side by side. In this case, the first and second wing sections are not arranged one above the other, but side by side. As for the rest, the structural design of the displacement elements corresponds exactly to that of the preceding embodiments.

Figure 2A:
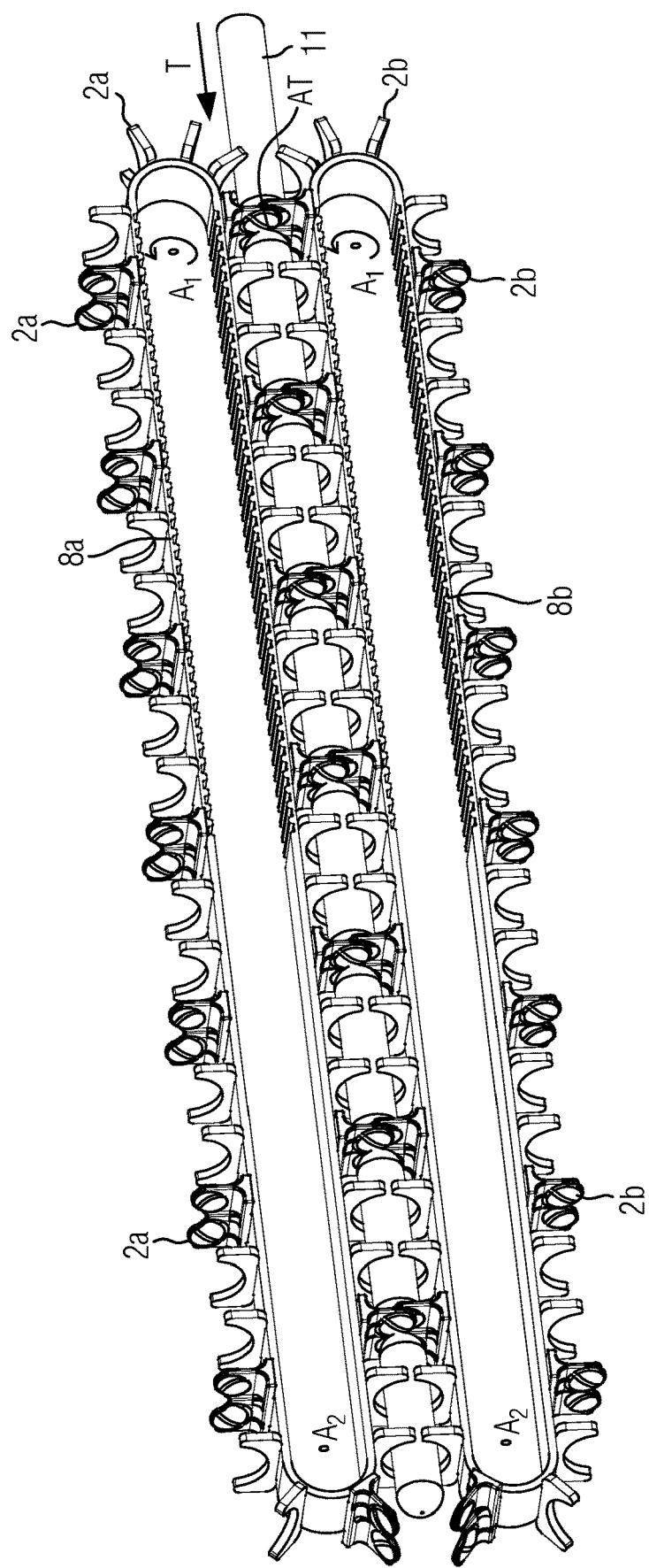
FIG. 2A shows, in a perspective view, an embodiment according to the present disclosure.
Figure 2B:
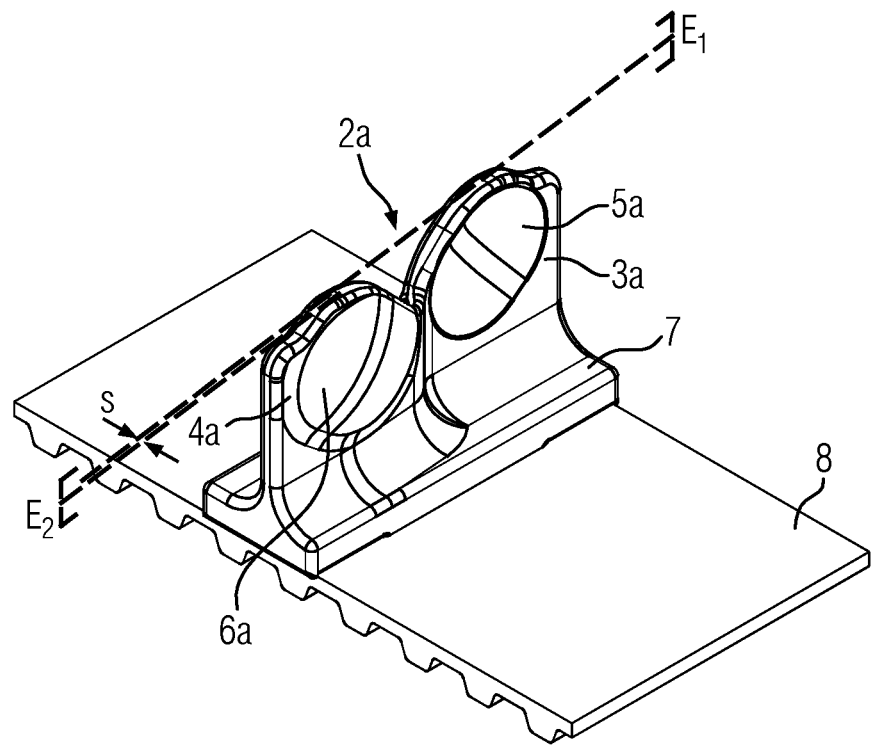
FIG. 2B shows, in a perspective view, a displacement wing on a conveying unit according to an embodiment.

As can be seen from FIG. 2B, a displacement element, which here has a wing 2a, is fixed to a conveying unit 8 via the holder 7. Also in this case, the wing 2a has a first and a second wing section 3a, 3b, which are configured here, for example, like those in connection with the embodiment shown in FIGS. 4A-4D, i.e. they are arranged displaced from each other. Even though this is not shown, the first and second wing sections 3a, 3b and 4a, 4b may be arranged in one plane as in connection with the embodiment shown in FIGS. 5A-5C.

As can be seen from FIG. 2A, the displacement elements are arranged at predetermined intervals on a conveying unit, in this case on a conveyor belt 8, which circulates around two axes A1, A2 and which simultaneously serves as a conveying device in the conveying direction T. The belt may, however, also circulate around a plurality of axes of rotation.

As can especially be seen from FIG. 2A, the wings 2a, 2b move towards each other, the sausage strand being conveyed between the displacement elements in the conveying direction T.

As shown in connection with FIGS. 4A-4D and 5A-5C, the wings 2a, 2b either interengage crosswise or come to lie parallel to each other. In the embodiment shown in FIG. 2A, the first and second displacement elements 1a, 1b interengage. At the point identified by AT, the two wings 2a, 2b are in engagement, i.e. they occupy the division position. Here, the twist-off point can jump in. The displacement element pairs moved by the belts 8a, 8b carry the divided sausage strand along in the conveying direction T. The circulating conveying units 8a, 8b thus also serve as a conveying device. Between the displacement element pairs, guide elements may be arranged on the conveying units, these guide elements ensuring that, in particular in the case of comparatively long sausages, the sausage strand will not swerve, but will be conveyed along its longitudinal axis in the conveying direction T.

Figure 6A:
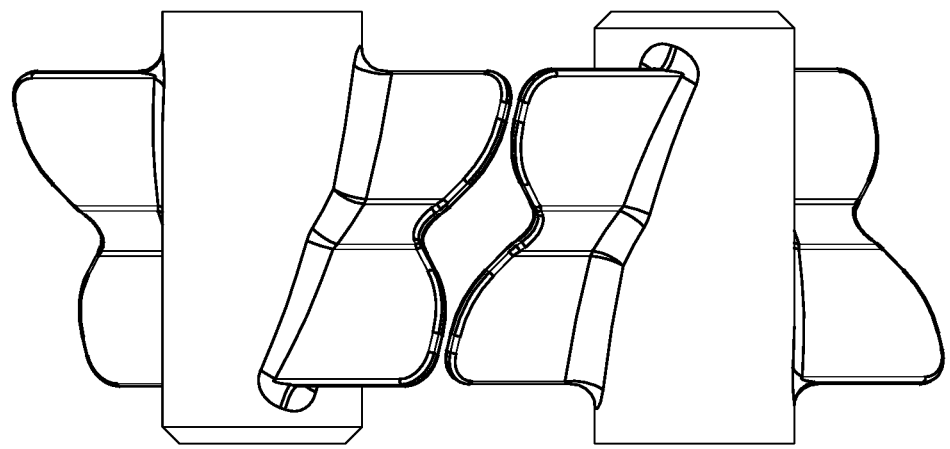
FIG. 6A shows a displacement element pair according to the prior art.
Figure 6B:
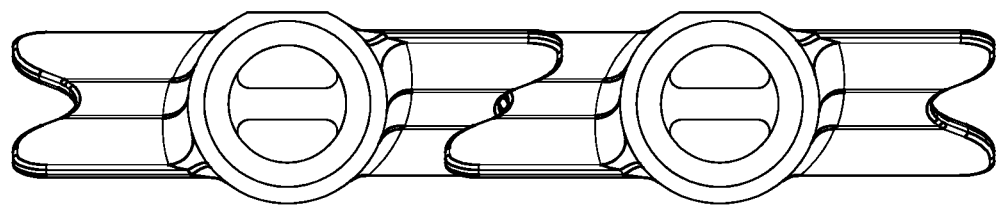
FIG. 6B shows a top view of a displacement element pair according to the prior art.
Figure 6C:
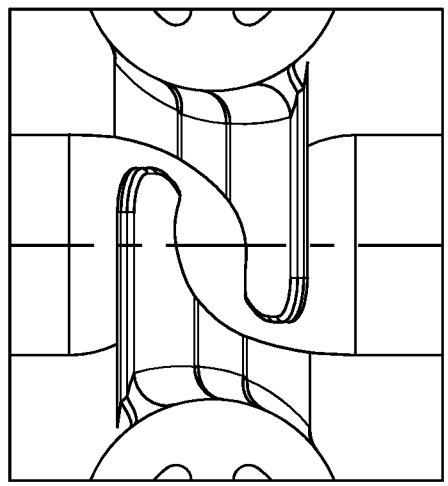
FIG. 6C shows a top view of a displacement element pair at the division position according to the prior art.
Figure 6D:
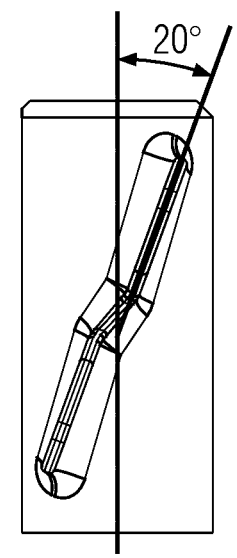
FIG. 6D shows a side view of the displacement element according to the prior art.
Figure 7:
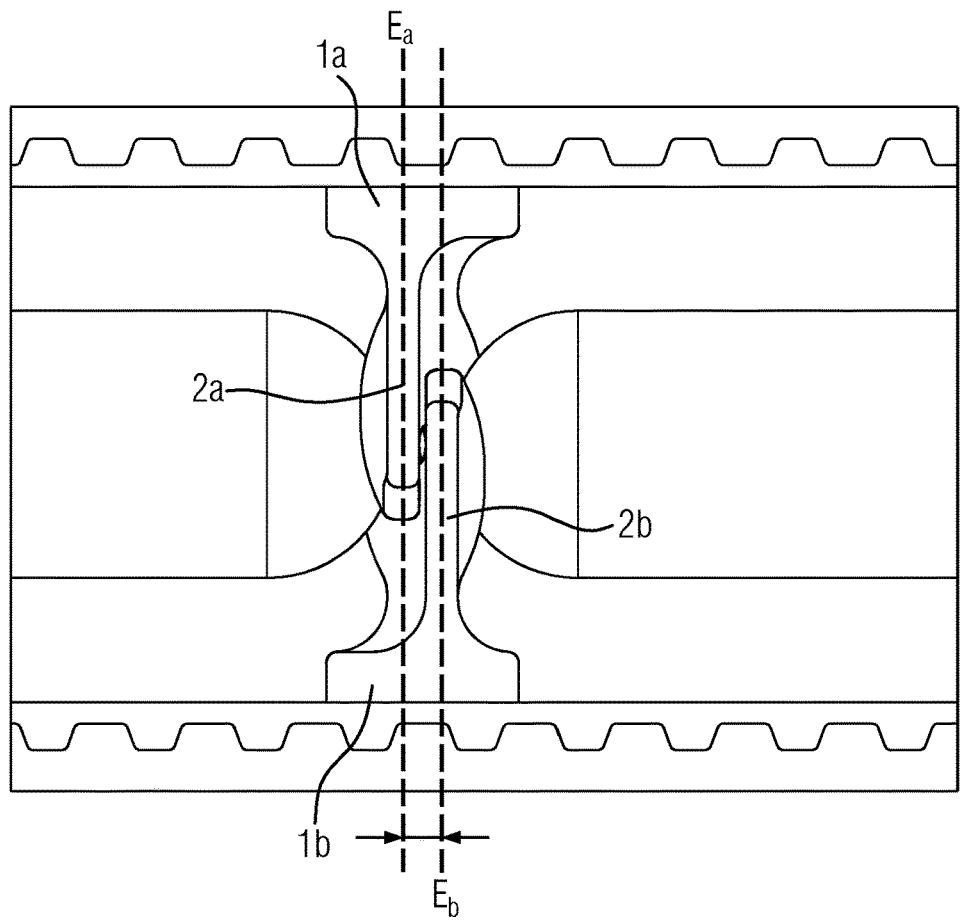
FIG. 7 shows a top view of a displacement element pair at the division position according to the present disclosure.

FIG. 7 shows that, due to the parallel orientation of the displacement edges of the wings 2a, 2b and the small distance between the wings, at least in the area between the outer points O and U, which can be constant, the formation of a respective fold between the wings of the displacement elements, as shown in FIG. 6C, can be prevented. In FIG. 7 it can clearly be seen that the wings 2a, 2b are arranged in two spaced-apart parallel planes Ea, Eb.

In the embodiments shown above, the displacement elements are configured such that the cutouts 12 overlap each other, in particular in a diamond shape, in such a way that a small opening still remains so that the sausage strand will not be sheared off. However, it is also possible to configure the pair of displacement elements such or to space them apart such that the cutouts will overlap fully and the sausage strand will be severed so as to produce individual sausages. To this end, the displacement edge of at least one displacement element may, at least partially, be configured as a blade or may be provided with a blade.

A plurality of wings may be arranged around the circumference of a holder 7 of a displacement element and a plurality of displacement elements may be arranged on the circulating conveying units 8. The production speed can be increased in this way.

According to a further embodiment, the apparatus additionally comprises a twist-off unit 14 for rotating the sausage strand 11 to be filled about its longitudinal axis L and/or, for example in the conveying direction downstream of the displacement elements 1a, 1b, a unit for clipping or a unit for tying-up or bonding or sealing the sausage strand.

Figure 8:
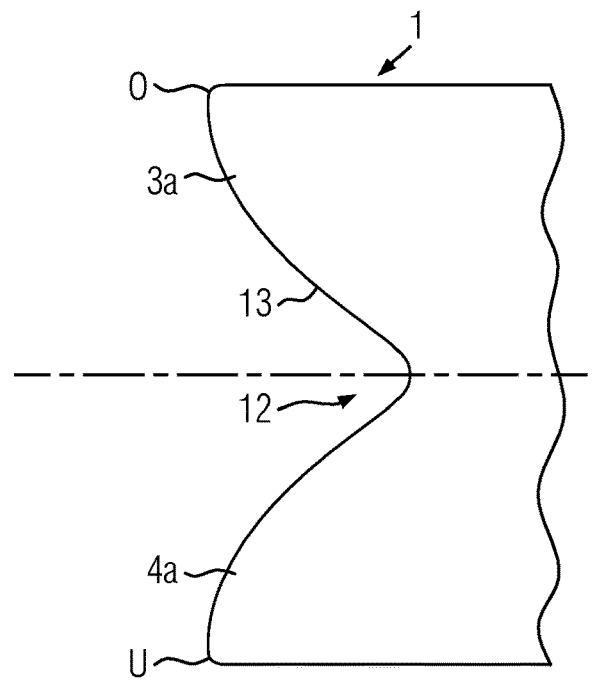
FIG. 8 shows a side view of a wing according to a further embodiment according to the present disclosure.

FIG. 8 shows a further possible embodiment of a wing, which, too, has a V-shaped cutout 12 and which is particularly suitable for comparatively large calibers up to 60 mm Here, the wing sections are configured such that they have the largest dimension t at the top and at the bottom, i.e. the points O and U are located at the upper and lower edges.

The invention claimed is:

1. A displacement element pair for dividing a sausage strand, conveyed between the displacement elements, into individual sausages, each displacement element (1a, 1b) having at least one wing with a first wing section and a second wing section (4a, 4b) between which an outwardly widening is formed,
wherein
both the first and the second wing section have a laterally curved pocket or an opening.

2. The displacement element pair according to claim 1, wherein the displacement edges of the first and second wing sections of a respective displacement element are located, at least in the area of the widening cutout, either
a) in substantially parallel planes or
b) in a common plane.

3. The displacement element pair according to claim 2, wherein in case a)
the distance between the planes lies in a range corresponding to the dimension of the displacement wing thickness (s)+0 to 4 mm.

4. An apparatus for dividing a sausage strand by means of a displacement element pair according to claim 1, comprising
a conveying device for conveying the stuffed sausage strand between the opposed displacement elements and
a rotating mechanism for rotating the displacement elements about a respective axis of rotation or for moving them such that they circulate around a plurality of axes of rotation.

5. The apparatus according to claim 4, wherein the apparatus additionally comprises a twist-off unit for rotating the sausage strand to be filled about its longitudinal axis and/or that the apparatus comprises a unit for clipping or a unit for tying-up or bonding or sealing the sausage strand after the displacement process.

6. The apparatus according to claim 4, wherein the displacement elements are arranged such that, at a division position, at which the widening cutouts of the opposed displacement elements overlap maximally, the respective displacement edges of the first wing section of a displacement element and of the second wing section of the opposed displacement element are located in essentially parallel planes, at least in the area of the respective widening cutout.

7. The apparatus according to claim 4, wherein the displacement elements can be rotated about their central axis and that the central axis extends substantially parallel to the planes, in which the respective displacement edge of the wing sections is located at least in the area of the widening cutout.

8. The apparatus according to claim 7, wherein the respective displacement edge of the wing sections extends perpendicular to the conveying direction.

9. The apparatus according to claim 4, wherein the respective opposed displacement elements are arranged on two conveying units, including a conveying chain or a conveyor belt, which circulate around a plurality of axes.

10. An apparatus according to claim 9, wherein the axes of rotation extend substantially parallel to the planes, in which the displacement edges of the first and second wing sections are arranged in the area of the cutout, and extend perpendicular to the conveying direction.

11. The apparatus according to claim 4, wherein a displacement element has a plurality of circulating wings or that
a plurality of displacement elements have a respective wing arranged on the respective circulating conveying unit.

12. The apparatus according to claim 4, wherein the displacement elements are produced by means of 3D printing or injection molding.

13. The apparatus according to claim 4, wherein, at least in the area of the cutout widening including a V-shape, the distance between the plane in which the displacement edge of the first wing section is located and the plane in which the displacement edge of the first wing section of the opposed displacement element is located, and
the distance between the plane in which the displacement edge of the second wing section is located and the plane in which the displacement edge of the second wing section of the opposed displacement element is located, is in a range corresponding to the dimension of the displacement wing thickness +0 mm to +4 mm.

14. The displacement element pair according to claim 2, wherein in case a),
the curved pocket is curved outwards to a first side in the first wing section of a respective displacement element, and the curved pocket is curved outwards to the opposite side in the second wing section, and that in case b), the curved pockets in the first and second wing sections are curved to the same side.

15. The displacement element pair according to claim 1, wherein, at a division position, at which the sausage strand is maximally constricted and the two widening sections overlap maximally,
in case a)
the wing of the first displacement element and the wing of the second displacement element can interengage and
in case b)
the wings can be arranged substantially parallel side by side.

16. The displacement element pair according to claim 15, wherein the wings are arranged in a flag-like manner on a holder, via which they are connectable to a rotating mechanism for rotating the displacement elements about an axis or for moving them such that they circulate around a plurality of axes.

17. A displacement element pair according to claim 1, wherein the displacement element is made of a material of the following group:
plastic, metal.

18. The displacement element pair apparatus according to claim 1, wherein the at least one wing does not extend radially from a holder that rotates about an axis.

\* \* \* \* \*